(12) United States Patent
He et al.

(10) Patent No.: US 11,785,136 B2
(45) Date of Patent: Oct. 10, 2023

(54) AUDIO QUALITY FEEDBACK DURING LIVE TRANSMISSION FROM A SOURCE

(71) Applicant: INTERNATIONAL BUSINESS MACHINES CORPORATION, Armonk, NY (US)

(72) Inventors: Jenny Jing He, Chandler's Ford (GB); Adrian Kyte, Broadstone (GB); Joseph R Winchester, Hursley (GB); Cheng Fang Wang, Beijing (CN); Ping Xiao, Changping (CN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 17/083,389

(22) Filed: Oct. 29, 2020

(65) Prior Publication Data
US 2022/0141331 A1    May 5, 2022

(51) Int. Cl.
G10L 25/69      (2013.01)
H04M 3/22       (2006.01)
G10L 15/22      (2006.01)

(52) U.S. Cl.
CPC .......... H04M 3/2236 (2013.01); G10L 15/22 (2013.01); G10L 25/69 (2013.01); *G10L 2015/225* (2013.01)

(58) Field of Classification Search
CPC ..... G10L 25/69; H04M 3/2236; H04B 17/309
See application file for complete search history.

(56) References Cited

U.S. PATENT DOCUMENTS

| | | | |
|---|---|---|---|
| 6,275,797 B1 * | 8/2001 | Randic | H04M 3/2236 704/231 |
| 9,230,562 B2 | 1/2016 | Miller | |
| 9,641,681 B2 | 5/2017 | Nuta | |
| 9,838,544 B2 | 12/2017 | Zhao | |
| 2018/0241882 A1 | 8/2018 | Lee | |
| 2019/0189117 A1 | 6/2019 | Kumar | |

FOREIGN PATENT DOCUMENTS

| | | | |
|---|---|---|---|
| DE | 1020211235771 A | 5/2022 | |
| GB | 2603995 A | 8/2022 | |

(Continued)

OTHER PUBLICATIONS

Disclosed Anonymously, "Method and System to Improve Audio Conference Session," IP.Com Prior Art Database Technical Disclosure, IP.Com No. IPCOM000260578D, https://priorart.ip.com/IPCOM/000260578, Dec. 8, 2019, 4 pages.

(Continued)

*Primary Examiner* — Feng-Tzer Tzeng
(74) *Attorney, Agent, or Firm* — Anthony Curro

(57) ABSTRACT

Method and system are provided for audio quality feedback during live transmission from a source that is received at multiple audience devices. The method carried out at a server includes: obtaining audio information of an audio signal as received by at least some of the audience devices in a transmission session; classifying one or more subsets of the audience devices by one or more common factors per subset; and analyzing the obtained audio information from the audience devices in conjunction with the classifications of the subsets of the audience devices to determine one or more common factors that affect received audio quality at an identified subset of the audience devices classified by the one or more common factors. The method provides feedback of the one or more common factors to at least one of the audience devices in the identified subset or to the source device, or to both.

22 Claims, 8 Drawing Sheets

(56) References Cited

FOREIGN PATENT DOCUMENTS

| JP | 2022074021 A | | 5/2022 |
|----|--------------|---|--------|
| WO | WO 2001035546 A1 | * | 11/1999 |
| WO | WO 2001035546 A1 | * | 11/2000 |
| WO | WO 2001035546 A1 | * | 5/2001 |

OTHER PUBLICATIONS

IBM, "Understanding Recognition Results," IBM Cloud Docs/ Speech to Text, Last Updated Jul. 2, 2020, accessed Oct. 28, 2020, https://cloud.ibm.com/docs/speech-to-text?topic=speech-to-text-basic-response, 9 pages.

Mell, et al., "The NIST Definition of Cloud Computing," Recommendations of the National Institute of Standards and Technology, U.S. Department of Commerce, Special Publication 800-145, Sep. 2011, 7 pages.

United Kingdom Intellectual Property Office, "Combined Search and Examination Report Under Sections 17 and 18(3)," dated Jun. 1, 2022, 9 pgs., GB Application No. GB2114408.4.

IBM, "Response to the Combined Search and Examination Report dated Jun. 1, 2022," UK Patent Application No. 2114408.4, dated Oct. 25, 2022, 26 pgs.

Examination Report, Your ref: DP/P496686GB, Application No. GB2114408.4, dated Dec. 23, 2022, pp. 1-3.

Response to Office Action, Application No. 2114408.4, date filed Feb. 23, 2023, 36 pages.

* cited by examiner

AUDIO QUALITY FEEDBACK DURING LIVE TRANSMISSION FROM A SOURCE

BACKGROUND

The present invention relates to audio quality feedback, and more specifically, to audio quality feedback during live transmission from a source.

Teleconferencing enables a meeting of people in different locations using telecommunications. The term teleconference may include phone conferences, video conferences, or more complex web conferencing or webinars including sharing screens and chat interfaces.

Teleconferencing is often used for meetings for people at different locations to work together. In order to communicate effectively, people can share their screen to show information, they can watch the person who is talking and other participants, and they can use a chat window for non-audio communication. These artefacts greatly enhance the experience of the teleconference.

SUMMARY

According to a first aspect of the present invention there is provided a computer-implemented method for audio quality feedback during live transmission from a source device that is received at multiple audience devices, the method carried out at a server and comprising: obtaining audio information of an audio signal as received by at least some of the audience devices in a transmission session; classifying one or more subsets of the audience devices by one or more common factors per subset; analyzing the obtained audio information from the audience devices in conjunction with the classifications of the subsets of the audience devices to determine one or more common factors that affect received audio quality at an identified subset of the audience devices classified by the one or more common factors; and providing feedback of the one or more common factors to the audience devices in the identified subset and/or to the source device.

The described method has the advantage of determining groups of audience devices that are experiencing the same quality of received audio from a source device in a live transmission and that have common factors that may be causing the quality of the received audio. Feedback may be provided dynamically during the live transmission allowing the users of the audience devices and/or the source device to take remedial action.

The method of obtaining audio information of the audio signal as received by at least some of the audience devices in a transmission session may include obtaining an audio quality level as determined at an audience device by processing the received audio signal. The processing of the received audio signal may convert the audio signal using voice-to-text conversion and may analyze the resultant text to evaluate an audio quality level. Analyzing the resultant text to evaluate an audio quality level may determine a ratio of converted words to gaps in a sample period of the audio signal.

The method of obtaining audio information of the audio signal as received by at least some of the audience devices in a transmission session may include obtaining audio signal parameter data from the audience devices and comparing the audio signal parameters of the audience devices to determine a subset of audience devices having a similar received audio signal.

Classifying one or more subsets of the audience devices by one or more common factors per subset may include obtaining details of factors of each audience device and grouping a subset of audience devices with the same one or more factors. Different subsets of audience devices will therefore be affected by an issue with the one or more factors.

The method may include analyzing the obtained audio information from the audience devices to determine if the audio information is below a threshold quality for all audience devices and providing feedback to the source device that the overall audio quality being received is below a required quality. If all or a large proportion of the audience devices experience poor quality of received audio signal, this is an indication that the issue is with the transmission from the source device and appropriate feedback may be provided.

The method may include detecting a source device of a transmitted audio signal in the transmission session and determining audience devices in the transmission session from which to obtain audio information. The source device may vary during a live transmission as different users present in a teleconference and the method accommodates this by detecting the current source device.

Analyzing the obtained audio information from the audience devices in conjunction with the classifications of the subsets of the audience devices includes determining a correlation between one or more common factors and an audio quality level of the identified subset. This may enable positive factors or combinations of factors to be determined as well as negative factors or combinations of factors to provide constructive feedback of positive factors that may improve a user's received audio at an audience device.

The audio quality level may be one of configured range of audio quality levels from poor quality to high quality levels. The user may configure their preferred audio quality level to accommodate accessibility requirements of the user.

Classifying the multiple audience devices by common factors may include classifying by one or more of the group of: a location, a communication channel, a transmission media, and a configuration or type of an audience device.

According to another aspect of the present invention there is provided a computer-implemented method for audio quality feedback during live transmission from a source that is received at multiple audience devices, the method carried out at a server and comprising: obtaining audio information of an audio signal as received by at least some of the audience devices in a transmission session; obtaining factors relating to at least some of the audience devices in the transmission session; analyzing the audio information and the factors to determine a correlation between a quality of the received audio signals and one or more common factors for a subset of the audience devices; and providing feedback of the one or more common factors to the audience devices in the subset and/or the source device.

Analyzing the audio information and the factors may analyze audio information in the form of a quality level and compares the quality levels within and between groups of audience devices having one or more common factors to determine a subset of audience devices having a shared quality level.

According to a further aspect of the present invention there is provided a system for audio quality feedback during live transmission from a source that is received at multiple audience devices, comprising a server having a processor and a memory configured to provide computer program instructions to the processor to execute the function of a feedback system including: an audio information obtaining component for obtaining audio information of an audio signal as received by at least some of the audience devices in a transmission session; a classifying component for classifying one or more subsets of the audience devices by one or more common factors per subset; an analyzing component for analyzing the obtained audio information from the audience devices in conjunction with the classifications of the subsets of the audience devices to determine one or more common factors that affect received audio quality at an identified subset of the audience devices classified by the one or more common factors; and a feedback component for providing feedback of the one or more common factors to the audience devices in the identified subset and/or to the source device.

The system may include a feedback system component provided at an audience device including an audio quality level component for obtaining an audio quality level as determined at an audience device by processing the received audio signal. The audio quality level component may include a processing component for processing the received audio signal at an audience device including a voice-to-text conversion component for converting the audio signal using voice-to-text conversion and analyzes the resultant text to evaluate an audio quality level.

The audio information obtaining component at the server may obtain audio signal parameter data from the audience devices and the system may include an audio comparing component for comparing the audio signal parameters of the audience devices to determine a subset of audience devices having a similar received audio signal.

The classifying component may obtain details of factors of each audience device and may group a subset of audience devices with the same one or more factors.

The system may include an overall quality component for analyzing the obtained audio information from the audience devices to determine if the audio information is below a threshold quality for all audience devices and wherein the feedback component provides feedback to the source device that the overall audio quality being received is below a required quality.

The feedback component may provide feedback of the one or more common factors dynamically during the live transmission.

The system at the server may include a device detecting component for detecting a source device of a transmitted audio signal in the transmission session and determining audience devices in the transmission session from which to obtain audio information.

The analyzing component may include a correlation component for determining a correlation between one or more common factors and an audio quality level of the identified subset. The audio quality level may be one of a range of audio quality levels from poor quality to high quality levels. A configuration component may be provided for receiving a configuration of the audio quality level.

According to a further aspect of the present invention there is provided a system for audio quality feedback during live transmission from a source that is received at multiple audience devices, comprising a server having a processor and a memory configured to provide computer program instructions to the processor to execute the function of a feedback system including: an audio information obtaining component for obtaining audio information of an audio signal as received by at least some of the audience devices in a transmission session; a factor obtaining component for obtaining factors relating to at least some of the audience devices in the transmission session; an analyzing component for analyzing the audio information and the factors to determine a correlation between a quality of the received audio signals and one or more common factors for a subset of the audience devices; and a feedback component for providing feedback of the one or more common factors to the audience devices in the subset and/or the source device.

According to a yet further aspect of the present invention there is provided a computer program product for audio quality feedback during live transmission from a source that is received at multiple audience devices, the computer program product comprising a computer readable storage medium having program instructions embodied therewith, the program instructions executable by a processor to cause the processor to: obtain audio information of an audio signal as received by at least some of the audience devices in a transmission session; classify one or more subsets of the audience devices by one or more common factors per subset; analyze the obtained audio information from the audience devices in conjunction with the classifications of the subsets of the audience devices to determine one or more common factors that affect received audio quality at an identified subset of the audience devices classified by the one or more common factors; and provide feedback of the one or more common factors to the audience devices in the identified subset and/or to the source device.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Figure 1:
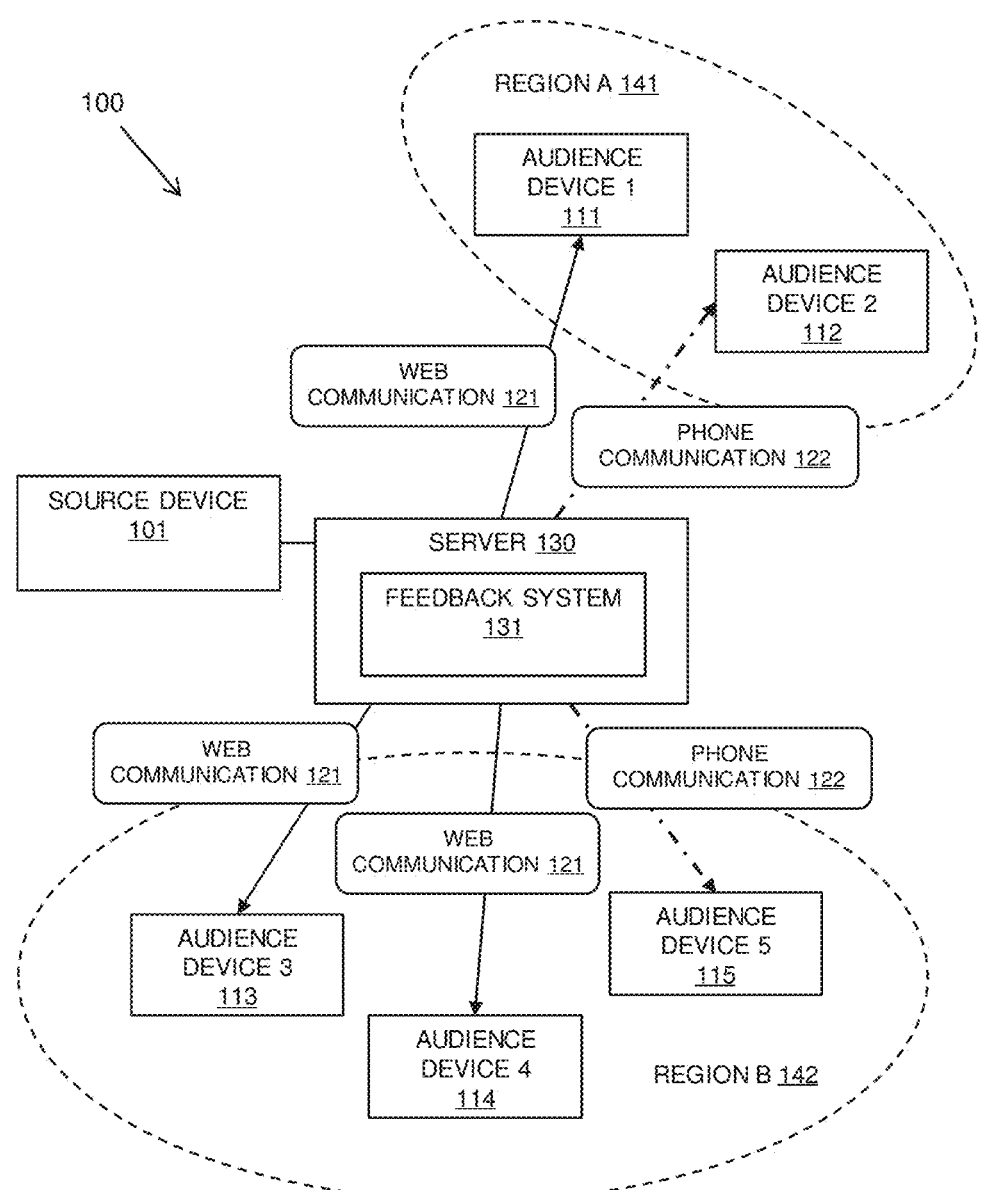
FIG. 1 is a schematic diagram illustrating a teleconferencing example in which embodiments may be implemented.

It will be appreciated that for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION

Generally, the most important dimension of a teleconference is the audio in the teleconference. Without hearing clearly, the participants struggle to follow what the speaker is talking about, despite what they can see via a display. An unclear audio signal can be caused by various issues including: bad transmission from the speaker's device to audience members' devices, bad reception at the audience members' devices, or caused by the speaker's position with respect to their microphone.

For the bad transmission or reception case, the audience may ask the speaker to move or speak more clearly; however, the audience may continue to experience the same problem and time may be wasted trying to identify and solve the issue.

In other cases where the poor audio is due to the position of the speaker, repeated interruption of a meeting to ask the speaker to move is uncomfortable for the audience and disruptive of the meeting.

The described method and system provide audio quality feedback during live transmission from a source that is received at multiple audience devices. This may be used during a teleconference including a phone conference, a video conference, a web conference, or any live broadcast of audio that is received and listened to by a distributed audience. The source and the audience may each use a computing or telecommunications device to receive the transmitted audio. The audio that is transmitted during a teleconference in accordance with the described method and system may be voice audio; however, at least some of the described embodiments may be used with other forms of audio transmission such as live music or other forms of audio.

The described method uses an evaluation of the audio quality received at audience devices during a transmission session, which may be measured using various described methods. The multiple audience devices participating in the transmission session are classified by common factors such as their location, their method of communication with the source, the type of device they are using, etc. An analysis of the received audio quality and the classification by common factors is used to determine one or more common factors that affect the received audio quality. Common factors may be any factors that may affect the quality of the received audio that are shared by a group of the participant devices. Feedback may be provided to the source device and/or to the audience devices providing information on the determined common factors that may be affecting the audio quality.

If poor audio quality is measured as received at a subset of audience devices that are classified as having the common factor of being connected via a mobile network operator phone network, feedback may be provided that there is an issue with that particular mobile phone network. Analysis of the classifications by common factors may establish that poor quality is being received with a combination of common factors such as using a particular mobile network operator data network in a particular city.

In the event that all the audience devices receive the same poor quality audio, the issue may be identified as being related to the source, such as the speaker position in relation to the microphone or background noise interference.

The method may also be used to determine common factors that result in very good quality audio at the audience devices in order to offer advice to other audience devices of the optimal method of receiving the transmitted audio.

Referring to FIG. 1, a schematic diagram 100 shows an example teleconferencing scenario in which the described method and system may be implemented. A source device 101 transmits audio to a plurality of audience devices 111-115. This may be via various forms of teleconferencing with the source device 101 and audience devices 111-115 each being, for example, a mobile communications device such as a mobile phone or a computing device such as a desktop or laptop computer. A user's device may be both a source device 101 and an audience device 111-115 depending on whether the user is a presenter or participant who is able to contribute to an audio, or a non-contributing participant.

The source device 101 and the audience devices 111-115 may be in communication with a server 130 providing the feedback functionality in the form of a feedback system 131. In an example embodiment, the feedback system 131 may be provided as a web service with applications provided at the source device 101 and audience devices 111-115 to gather information for use by the feedback system 131. This may be incorporated into an existing conferencing web service application that may be provided via the server 130 or via another server in communication with the server 130 of the feedback system 131.

FIG. 1 illustrates simplified common factors that may group subsets of the audience devices 111-115. An example of a common factor may be a location of the audience device 111-115 and this is illustrated by audience device 1 111 and audience device 2 112 being in region A 141 and audience device 3 113, audience device 4 114, and audience device 5 115 being in region B 142. A region may be a geographic region, such as a particular country, state, province, territory, or area having definable characteristics but not always fixed boundaries. Another example of a common factor may be the form of communicating used with the source device 101. This is illustrated by a subset of the audience devices in the form of audience device 1 111, audience device 3 11 and audience device 4 114 using a web communication 121 and a subset of audience device 2 112 and audience device 5 115 using a phone communication 122.

Common factors of the audience devices are envisioned to be more complex than the simple version shown in FIG. 1 and may include combinations of one or more of the following:
 (a) Location factors that may include a country, state, city, an organization's premises, or a portion of a building such as a floor or a room, ectara;
 (b) Connection factors that may include connection by a mobile phone network, a type of mobile phone network including by mobile network operator provider or by category of data network, a landline phone connection, a type of landline phone network, a transmission media over a phone network such as fiber optic, cable, copper wire, a type of Wi-Fi network, or Wi-Fi network provider, ectara;
 (c) Connection factors combined with location factors that may include a subnet of devices connecting through the Internet, part of a phone network, ectara; and
 (d) Device factors that may include a type of browser being used, a type of device, etc.

The feedback system 131 may evaluate the audio quality at the audience devices 111-115 and analyze this in comparison with common factors of the audience devices 111-115 to determine if there is a correlation that indicates that an audio quality is due to one or more common factors.

Issues that affect the audio quality may relate to the factors of the audience devices 111-115 and identifying groups of audience devices 111-115 that have similar audio quality can narrow down to the common factors that may be influencing the quality.

For example, if only audience devices 111 and 112 in region A 141 have poor quality then the poor quality may be due to the location; however, if only audience devices 113 and 114 that connect via web communication 121 in region B 142 have poor quality then the poor quality may be due to an issue with the web communication network in that region.

Figure 2:
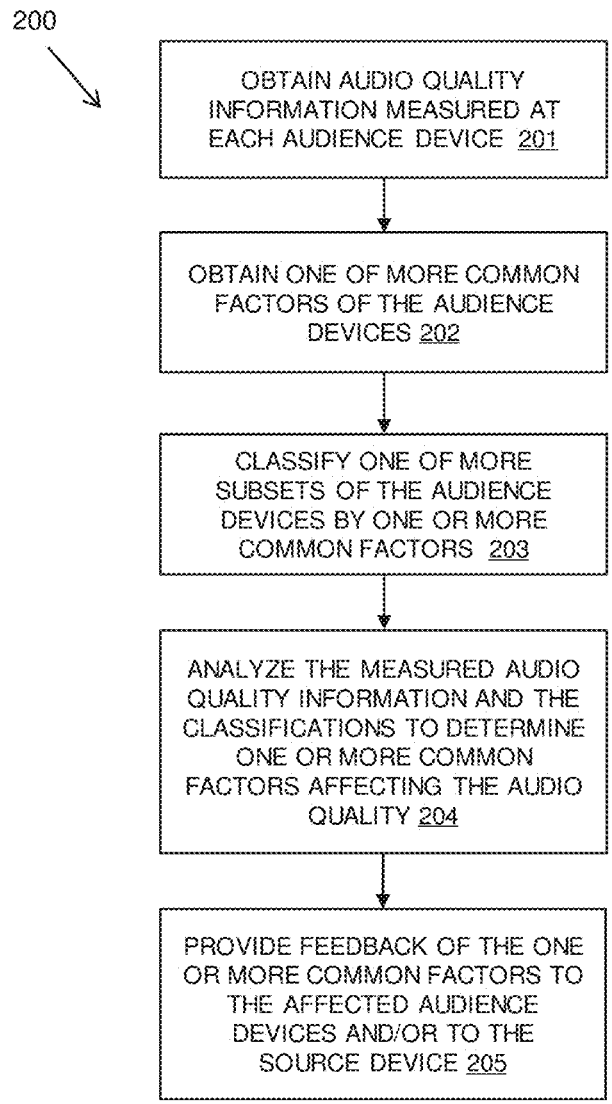
FIG. 2 is a flow diagram of an example embodiment of the described method in accordance with embodiments carried out at a server.

Referring to FIG. 2, a flow diagram 200 shows an example embodiment of the described method as carried out at a feedback system 131 provided at a server 130. For example, the server 130 may be a server providing teleconferencing functionality.

The method may obtain 201 audio quality information as received at each audience device and obtained from the audience devices. This may be obtained in real time as the audience devices receive transmitted audio from a remote source device over a communication channel.

The audio information may take various forms and different embodiments are described below. In some embodiments, the audio information may be processed at the audience devices 111-115 to generate audio quality information in the form of an audio quality measure or level that is sent to the feedback system 131. For example, if the audio is a speaking voice, a voice-to-text conversion process may be carried out on the received audio at an audience device 111-115 to enable analysis of the resulting text to determine a quality level based on the ratio of converted words. Audio quality levels received at the feedback system 131 from the different audience devices 111-115 may be compared to determine groups of audience devices 111-115 for which the quality level is the same.

In other embodiments, the audio information may be measured parameters of characteristics of the received audio signal that may be sent to the feedback system 131. This may apply to voice or other forms of audio. The characteristic parameters may include frequency, amplitude, power, noise, etc. Audio information in the form of parameter data may be sent from the audience devices 111-115 to the feedback system 131 for processing and evaluation. The evaluation may be by comparison with audio information received from other audience devices 111-115 and/or the transmitted audio of the source device 101.

The method may obtain 202 one or more common factors of the audience devices 111-115. Information about the common factors of each audience device 111-115 may be obtained by the feedback system 131 from the audience devices 111-115, for example, at the start of a teleconferencing session or when any change to a factor occurs during a transmission. In some implementations, the feedback system 131 at the server may be able to obtain information about the factors remotely from the connections of the audience devices 111-115 with the remote server 130. The method may classify 203 one or more subsets of the multiple audience devices 111-115 by one or more common factors for each subset. The classification may be carried out independently of the obtained audio quality information or may be arrived at as part of the analysis below.

The method may analyze 204 the audio quality according to the information received from the multiple audience devices 111-115 in the same conference session together with the common factors of the multiple audience devices 111-115 to determine one or more common factors that affect the received audio quality. This may be carried out by correlating the common factors and the received measured audio quality. This may use previously determined classifications or may result in the classifications as part of the analysis.

Various forms of correlation and threshold audio quality parameters may be applied. As a straightforward example, if the measured audio quality for each of a subset of audience devices classified by a common factor are all below a threshold measurement, then the common factor may be the cause of the poor quality. In a more complex analysis, a first subset having one or more common factors may be determined to be experiencing poor audio quality and whilst a second subset having one or more other common factors may be determined to be experiencing high quality audio, suggesting that the members of the first subset should changes any factors that can be changed to that of the common factors of the second subset.

The method provides 205 feedback relating to information on the one or more common factors determined to be a cause of poor quality and, optionally, high quality. This may be provided to the audience devices 111-115 that are members of a subset of one or more common factors that is determined to be a cause of the audio quality. The feedback may also be provided to the source device 101. The feedback may be provided as a notification on a screen of the audience devices 111-115 or source device 101 to avoid interruption of the audio. The feedback may enable the users of the audience devices 111-115 or the source device to take appropriate action if the cause is in their control, such as an audience user changing to another communication channel or the source user moving closer to the microphone without interruption to the meeting. The feedback may also include information on one or more common factors determined to result in good quality so that this information can be used by the audience users to change their factors such as the network being used.

For example, if the audience devices that use the same communication means connecting to the teleconference have similar quality that is worse than the audience devices connected through a different means, this group of audience users will be made aware of this and advised to change to another means of connection.

If all the audience devices have similar bad quality, then this may be fed back to the source device so that the speaker can take corrective action, for example, by moving closer to the microphone or making other adjustments at the source device such as removing background noise.

The described method caters to the end-to-end path between a speaker and audience. This enables the speaker and audiences to be aware of how the audio signal is being received and to take appropriate actions themselves to minimize interruption to the meeting. By using the described method, the speaker may be made aware of on how well their audio signal is being received at the audience end. This may enable the speaker to adjust and make the audio signal clearer and better. The audience is made aware if the problem is with their connection/region so they can change to another way of connecting. This method can greatly improve the meeting flow.

The identification of the source device 101 may change during the course of a conference session when different participants speak and the method may adapt in real time to such changes to evaluate received audio at a new combination of audience devices 111-115.

The method may function to provide feedback with a slight delay from real time caused by processing the audio signal and determining the common factors. The evaluation of audio quality may be carried out continuously or on samples of received audio at regular intervals.

Figure 3A:
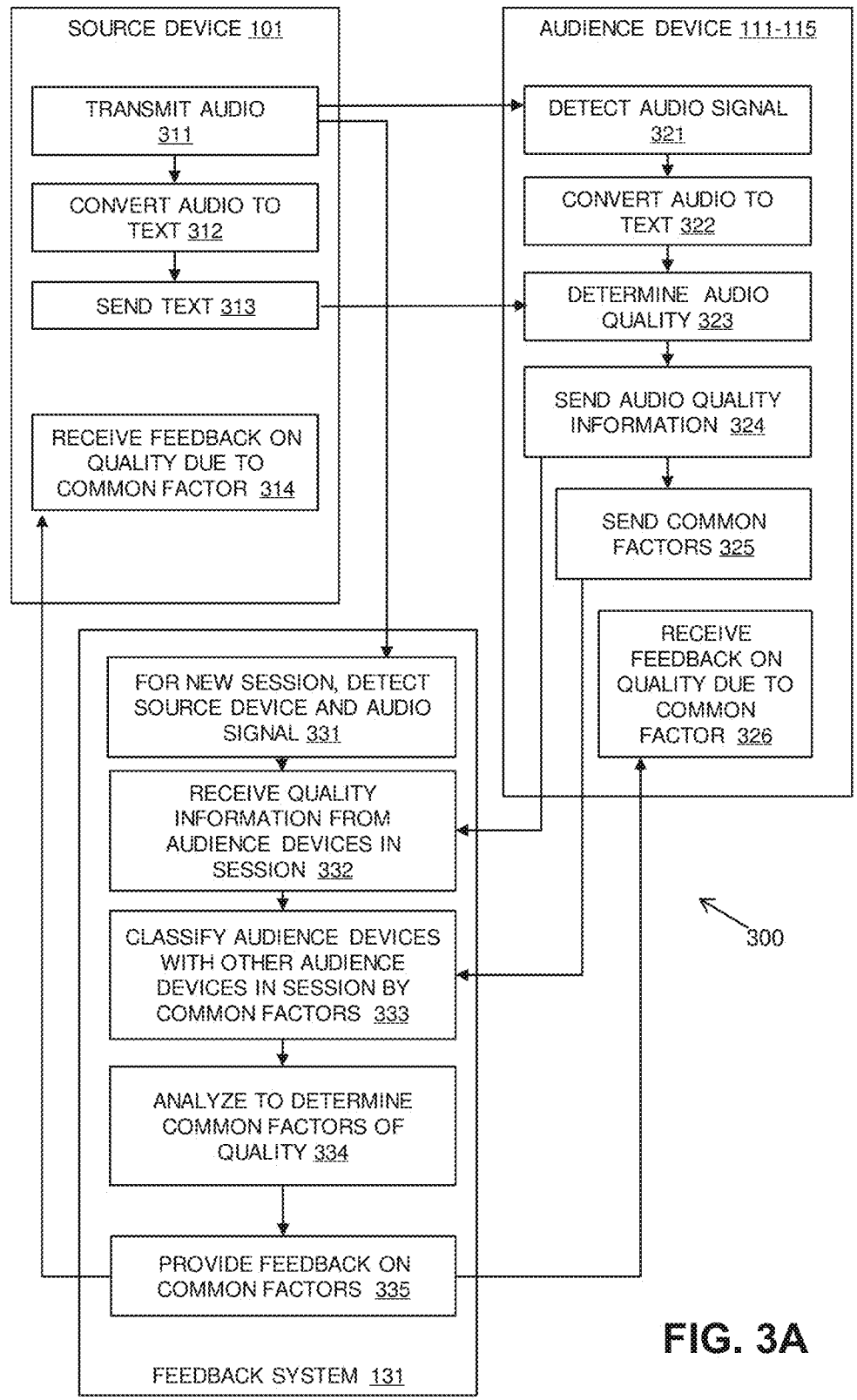
FIG. 3A is a flow diagram of an example embodiment of the described method in accordance with embodiments showing the interaction of the server and user devices.

Referring to FIG. 3A, a flow diagram 300 shows an example embodiment of the described method.

When a teleconference session starts, a presenter transmits 311 an audio signal from a source device 101. A feedback system 131 runs at a teleconference server 130 and detects 331 that a person in the teleconference is talking. The feedback system 131 queries the server 130, and obtains information identifying the source device 101 as the end point via which the speaker is connected into the teleconference session and identifies their audio signal being received. The identification of the source device 101 may change during the course of a session when different participants speak and the feedback system 131 may adapt in real time to such changes.

A component of the feedback system 131 that runs at each of the audience devices 111-115 detects 321 an audio signal as received from the source device 101 and uses voice-to-text conversion software or a similar application programming interface (API) service, to convert 322 the audio signal to plain text. There are many existing voice-to-text conversion software offerings that can perform this, e.g., IBM Watson™ Speech to Text API. The voice-to-text conversion process may be carried out continually or for a sample portion of received audio at regular intervals.

The component of the feedback system 131 that runs at the audience devices 111-115 determines 323 the received audio quality from the resultant text. The resultant text may be measured by the ratio of converted words to unconverted words to provide a quality level based on the ratio. This gives a quick quality assessment and does not need other information.

If the resultant text is sufficiently good, i.e. whenever the speaker speaks, the audio can be successfully converted to text, the audio signal is deemed as good quality. For example, the speaker said "This is the summary of the session", and the converted text was "This is the summary of the session". For each spoken word, there is a corresponding converted text word. The ratio of conversion is 100%, indicating a good quality.

If the converted text turns out to be fragmented for a period of duration of the audio signal, i.e. there are gaps in the text or gaps in a sample period of the audio signal, even though the speaker was speaking at those gaps, the audio is deemed as bad quality. For example, the speaker said "This is the summary of the session" in an identified period, such as in the last 2 seconds. The converted text was "This_ the_ _the session". Each "_" indicates that there is audio signal at that point of time but the signal cannot be converted into text. The ratio is 4 out of 7 words being converted successfully to text in the example shown. This is deemed as bad quality. The assessment of quality can be carried out in a chunk of a number of words, such as 5-word chunks. The level of the ratio that is deemed as good or bad can be adjusted by the operator on the teleconference server or by the user on an audience device.

As an alternative method of determining 323 the audio quality at the audience device 111-115, a component of the feedback system 131 that runs at the source device 101 may convert 312 the audio signal at the source device 111-115 and send 313 the converted text to the audience devices 111-115 with the transmitted 311 audio signal. The component at the audience device 111-115 can compare the converted 322 text obtained from the received audio signal 321 at the audience device 111-115 with the received converted text as converted 312 at the source device 101. The comparison of the text may be used to determine the quality level of the received audio signal at the audience device 111-115. This may result in a slight delay in waiting for the source device 101 to send the converted text. It may be that only a sample of converted text is sent for a few spoken words at regular intervals for comparison.

The components of the feedback system 131 at the audience devices send 324 the quality level of the received audio signal to the feedback system 131 at the teleconference server 130. The components of the feedback system 131 at the audience devices send 325 their common factors to the feedback system 131 at the teleconference server 130, for example, common factors such as their region and means of connection. The information on the common factors 325 of the audience devices 111-115 may be sent with the quality level information or may be collected by the feedback system 131 at a registration time or at the start of a session and may be updated if the factors change.

The feedback system 131 may receive 332 audio quality information from the audience devices 111-115 of the session. The feedback system 131 may also receive common factor information from the audience devices 111-115 of the session. These forms of information may be received together from the audience devices 111-115 at regular intervals during a session, or may be received separately at different times.

The feedback system 131 may classify 333 the audience devices 111-115 in the session by their common factors and may analyze 334 the common factors with respect to the audio quality information to determine common factors affecting the audio quality received at the audience devices 111-115.

The feedback system 131 provides 335 feedback on the common factors affecting the audio quality to the source device 314 and/or to the audience devices 326.

For example, if the audio quality for one group of region and connection combination is worse than another, the audience devices in the group may be sent a message, or a signal shown on the device's user interface about the quality of audio and suggesting they connect via another connection method.

If the quality across all groups is not good, the speaker at the source device may be notified that the audio quality transmitting out from their device is not good. The notification can be the forms of a graphic indicator symbol or light, for example, a green sign for good quality, and a red sign for bad quality. The speaker can see the indicator and adjust their way of speaking to the microphone accordingly.

Figure 3B:
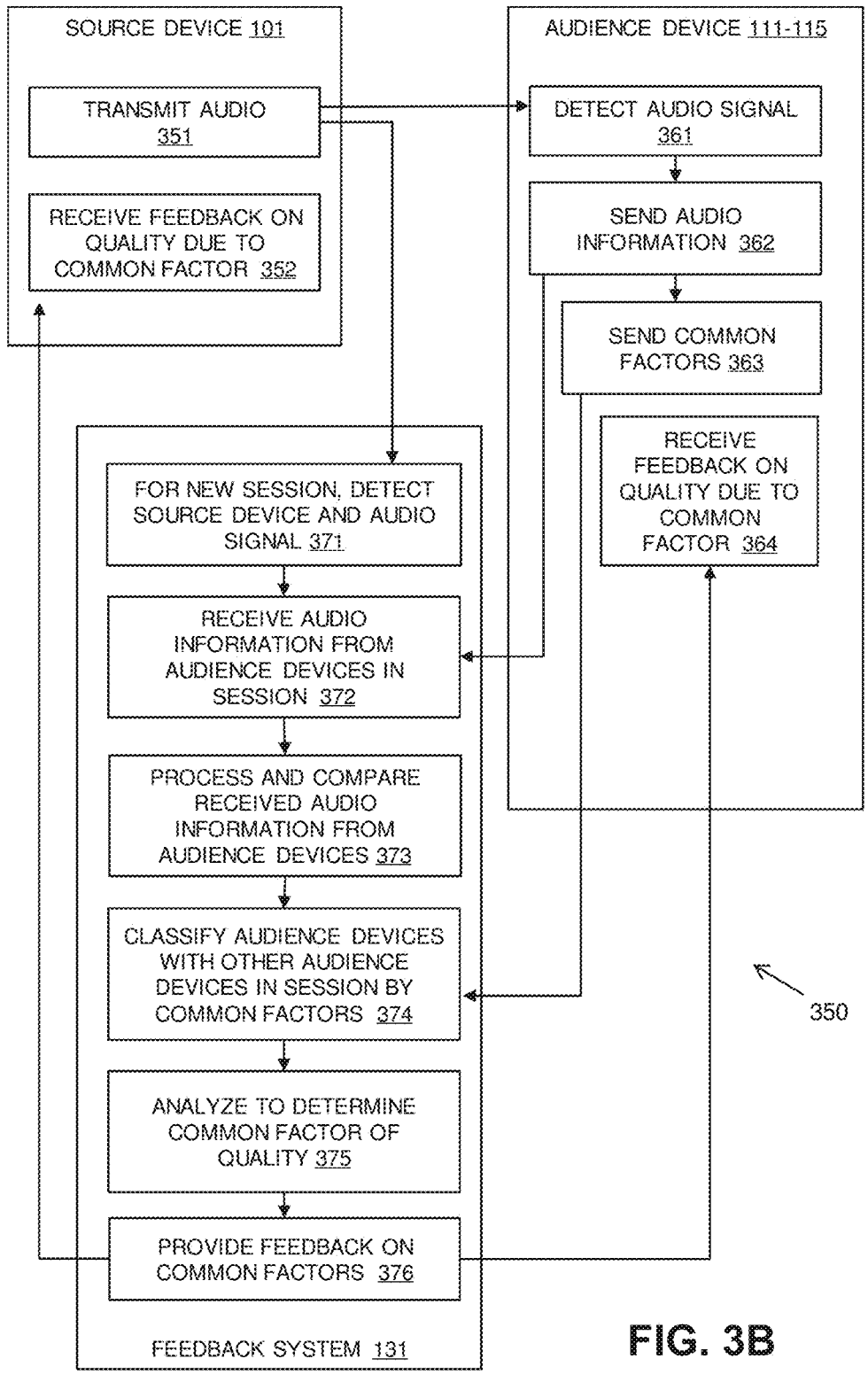
FIG. 3B is a flow diagram of another example embodiment of the described method in accordance with embodiments showing the interaction of the server and user devices.

Referring to FIG. 3B, a flow diagram 350 shows another example embodiment of the described method.

The method is similar to the method of FIG. 3A in that when a teleconference session starts, a presenter transmits 351 an audio signal from a source device 101. A feedback system 131 runs at a teleconference server 130 and detects 371 that a person in the teleconference is talking. The feedback system 131 queries the server 130, and obtains information identifying the source device 101 as the end point via which the speaker is connected into the teleconference session and identifies their audio signal being received. The identification of the source device 101 may change during the course of a session when different participants speak and the feedback system 131 may adapt in real time to such changes.

A component of the feedback system 131 that runs at each of the audience devices 111-115 detects 361 an audio signal as received from the source device 101 and, unlike the method of FIG. 3A, sends 362 audio information in the form of raw audio signal data or certain parameters of the audio signal data to the feedback system 131.

The components of the feedback system 131 at the audience devices also send 363 their common factors to the feedback system 131 at the teleconference server 130, for example, common factors such as their region and means of connection. The information on the common factors 363 of the audience devices 111-115 may be sent with the audio information 362 or may be collected by the feedback system 131 at a registration time or at the start of a session and may be updated if the factors change.

The feedback system 131 may receive 372 audio information from the audience devices 111-115 of the session. The feedback system 131 may process and compare 373 the audio information received from the audience devices 111-115 in the session and may determine audience devices 111-115 having similar audio information, which may indicate levels of poor quality or good quality.

The audio information may be audio characteristic parameters such as a measure of the change of frequency and amplitude of the audio received at the audience devices 111-115. The audio information received 372 at the feedback system 131 may be compared with the audio signal from the source device and/or with audio information received from other audience devices 111-115.

The feedback system 131 may also receive common factor information from the audience devices 111-115 of the session and the feedback system 131 may classify 374 the audience devices 111-115 in the session by their common factors. The feedback system 131 may analyze 375 the common factors with respect to the audio information to determine common factors affecting the audio quality received at the audience devices 111-115.

The feedback system 131 provides 376 feedback on the common factors affecting the audio quality to the source device 352 and/or to the audience devices 364.

Figure 4:
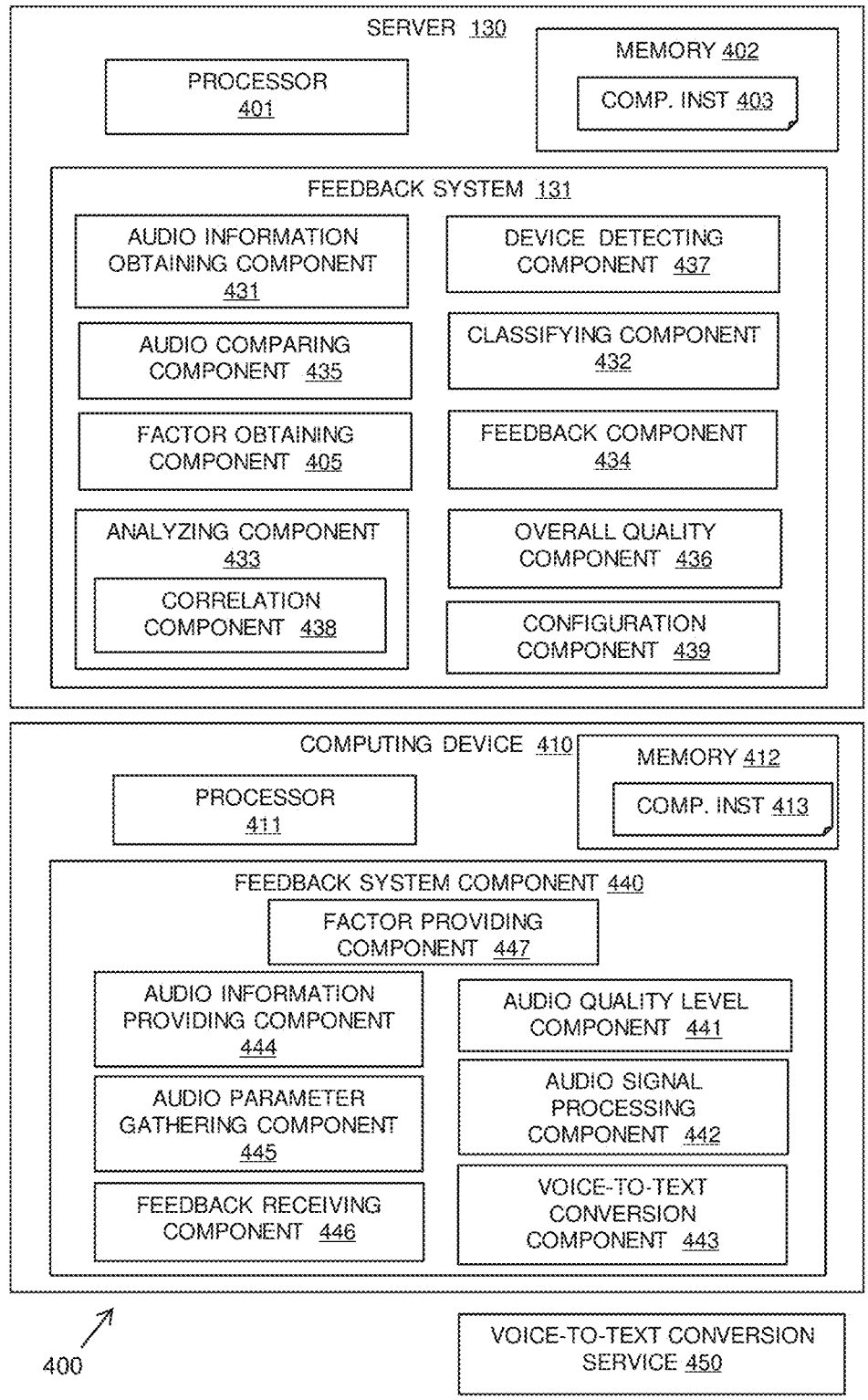
FIG. 4 is block diagram of an example embodiment of a system in accordance with embodiments of the present invention.

Referring to FIG. 4, a block diagram shows a system 400 including a server 130 providing a feedback system 131 and a computing device 410 providing functionality of an audience device and a source device used by an audience user or a source providing user during a transmission session and including a feedback system component 440 for interaction with the feedback system 131 of the server 130.

The server 130 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The feedback system 131 provided at the server 130 may include an audio information obtaining component 431 for obtaining audio information of an audio signal as received at audience devices in a transmission session and as obtained from the audience devices. In one embodiment, the audio information obtaining component 431 may obtain audio signal parameter data from the audience devices and the feedback system 131 may include an audio comparing component 435 for comparing the audio signal parameters of the audience devices to determine a subset of audience devices having a similar received audio signal.

The feedback system 131 may include a factor obtaining component 405 for obtaining details of factors of each computing device 410 and a classifying component 432 for classifying one or more subsets of the audience devices by one or more common factors per subset. The classifying component 432 may group a subset of audience devices with the same one or more factors.

The feedback system 131 may include an analyzing component 433 for analyzing the obtained audio information from the audience devices in conjunction with the classifications of the subsets of the audience devices to determine one or more common factors that affect received audio quality at an identified subset of the audience devices classified by the one or more common factors. The analyzing component 433 may include a correlation component 438 for determining a correlation between one or more common factors and an audio quality level of the identified subset.

The feedback system 131 may include a feedback component 434 for providing feedback of the one or more common factors to at least one of the audience devices in the identified subset (or all of them), to the source device, or to both the audience devices in the identified subset and the source device. The feedback component 434 may provide feedback of the one or more common factors dynamically during the live transmission.

The feedback system 131 may include an overall quality component 436 for analyzing the obtained audio information from the audience devices to determine if the audio information is below a threshold quality for all audience devices and wherein the feedback component 434 may provide feedback to the source device that the overall audio quality being received is below a required quality.

The feedback system 131 may include a device detecting component 437 for detecting a source device of a transmitted audio signal in the transmission session and determining audience devices in the transmission session from which to obtain audio information.

The feedback system 131 may include a configuration component 439 for receiving a configuration of the audio quality level.

Multiple computing devices 410 may be provided each including a feedback system component 440 for interacting with the feedback system 131 and each computing device 410 may act as source devices and/or audience devices during a transmission session. The feedback system component 440 may be provided as a web service or downloadable application at the computing device 410.

Each computing device 410 may include at least one processor 411, a hardware module, or a circuit for executing the functions of the described components which may be software units executing on the at least one processor. Memory 412 may be configured to provide computer instructions 413 to the at least one processor 411 to carry out the functionality of the components.

The feedback system component 440 may include an audio information providing component 444 for providing audio information to the audio information obtaining component 431 at the feedback system 131 at the server. The feedback system component 440 may include a factor providing component 447 for providing factor information to the factor obtaining component 405 at the feedback system 131 at the server.

In one embodiment, the feedback system component 440 includes an audio quality level component 441 for obtaining an audio quality level as determined at an audience device by processing the received audio signal. The feedback system component 440 may also include an audio signal processing component 442 for processing the received audio signal to evaluate an audio quality level and a voice-to-text conversion component 443 for converting the audio signal using a voice-to-text conversion process to obtain a resultant text to evaluate for the audio quality level. The voice-to-text conversion component 443 may use a remote voice-to-text conversion service 450. The audio information providing component 444 may provide the audio quality level determined at the computing device 410.

In other embodiments, the feedback system component 440 may include an audio parameter gathering component 445 for gathering received audio parameter data and sending this by the audio information providing component 444 to the feedback system 131 for processing.

The feedback system component 440 at the computing device 410 may include a feedback receiving component 446 for receiving the feedback of common parameters affecting received audio quality at the computing device 410 acting as an audience device or as a source device.

Figure 5:
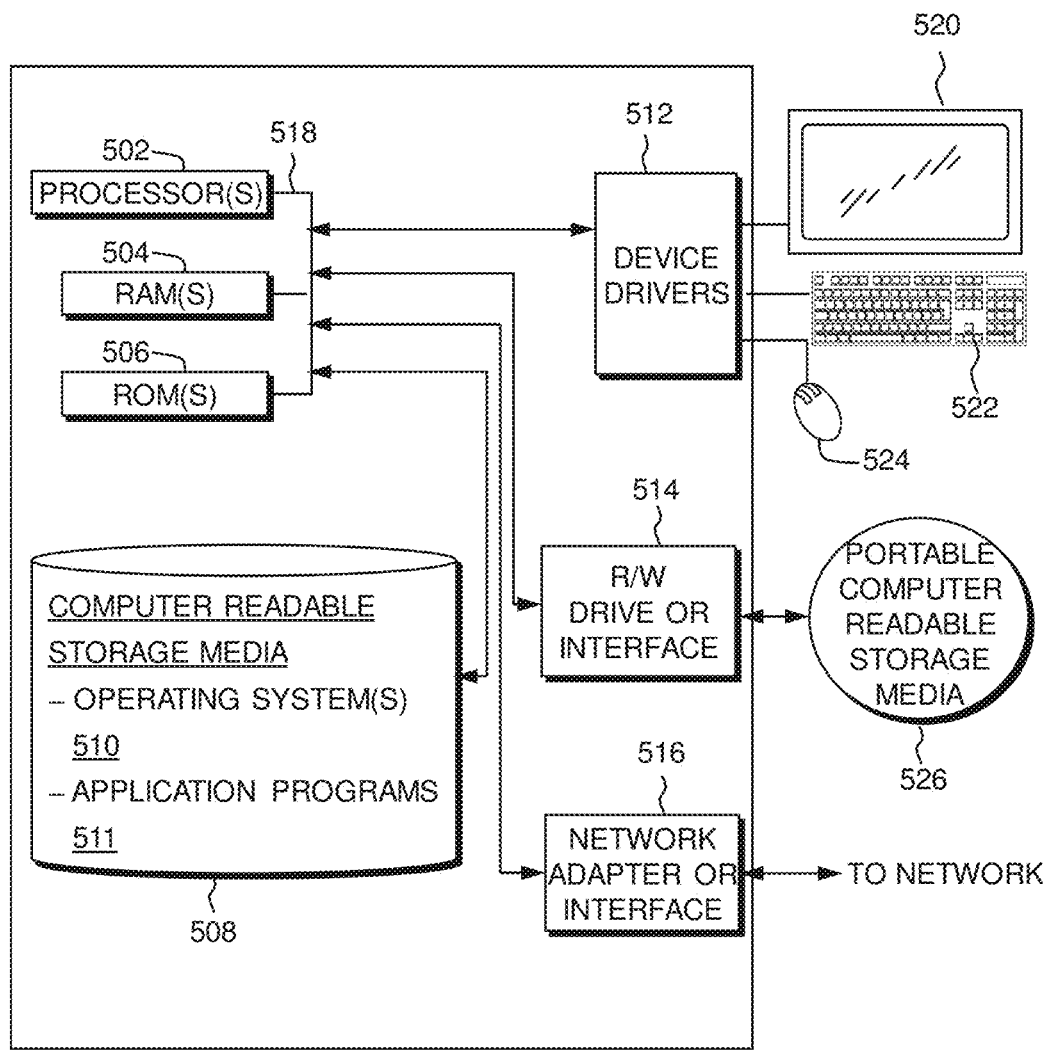
FIG. 5 is a block diagram of a computer system or cloud server in which embodiments may be implemented.

FIG. 5 depicts a block diagram of components of a computing system that may be provided as the server 130 or as a user computing device used as an audience device 111-115 or a source device 101, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing system can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the feedback system 131 and the feedback system component 440, are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system can also include a R/W drive or interface 514 to read from and write to one or more portable computer readable storage media 526. Application programs 511 on computing system can be stored on one or more of the portable computer readable storage media 526, read via the respective R/W drive or interface 514 and loaded into the respective computer readable storage media 508.

Computing system can also include a network adapter or interface 516, such as a TCP/IP adapter card or wireless communication adapter. Application programs 511 on computing system can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

Computing system can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
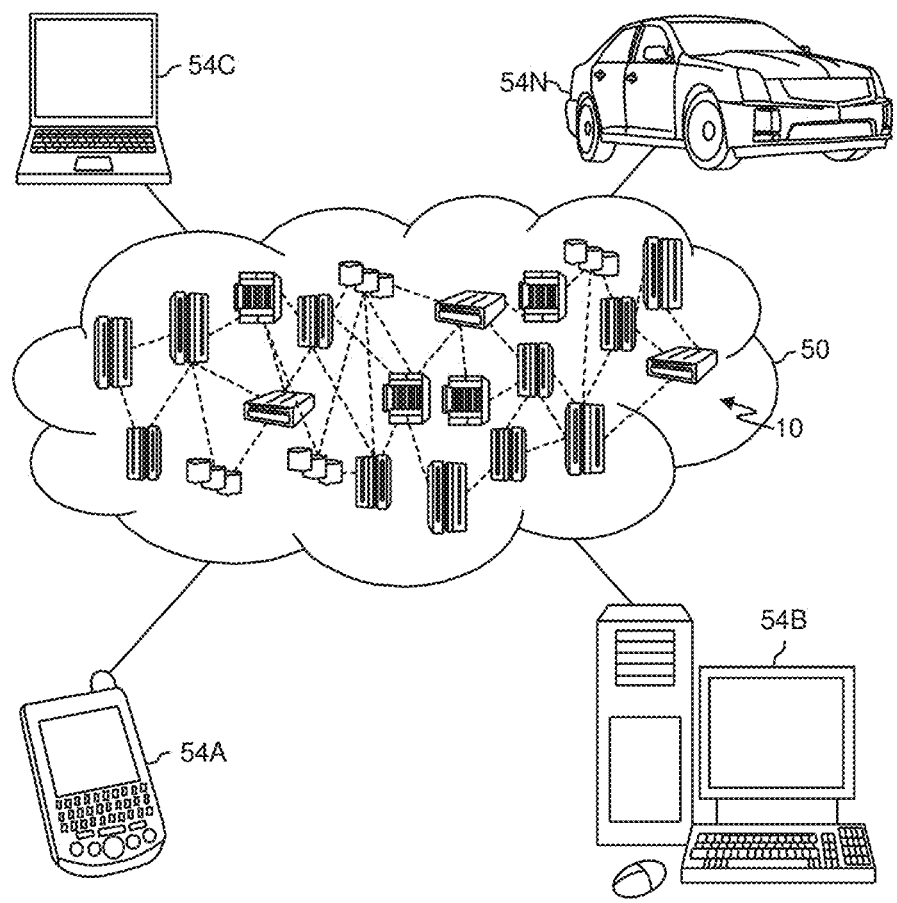
FIG. 6 is a schematic diagram of a cloud computing environment in which the embodiments may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
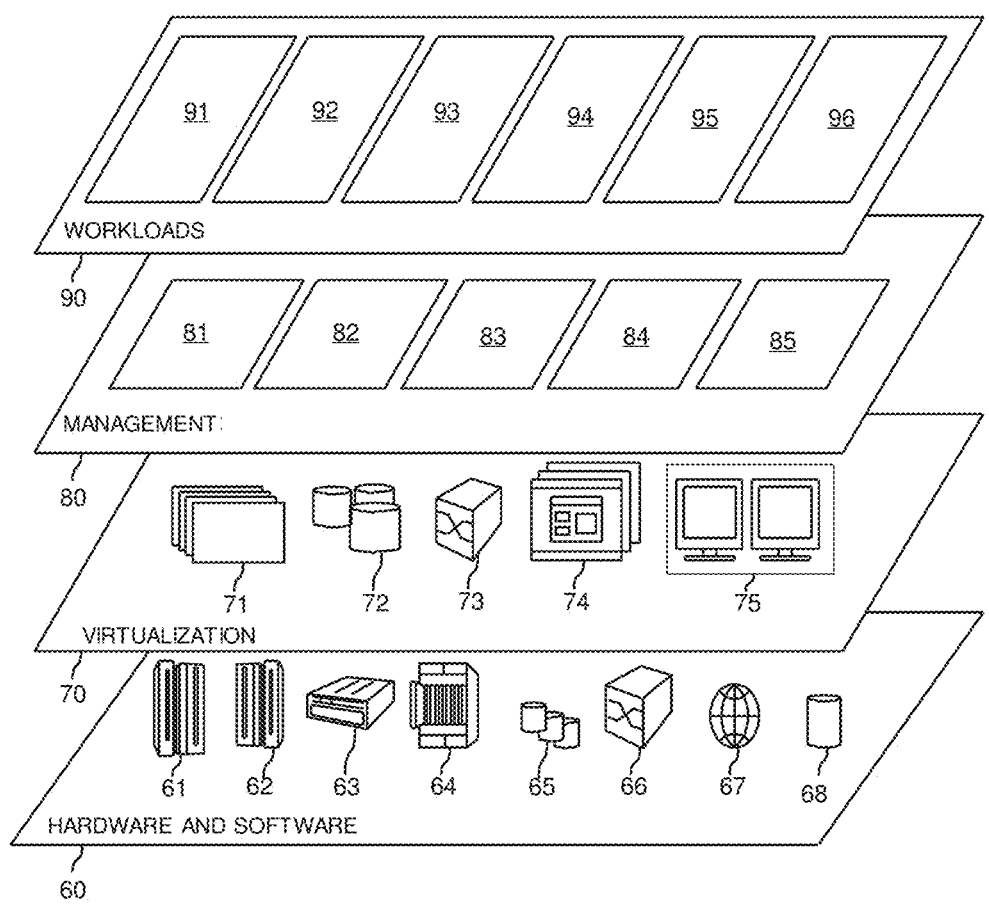
FIG. 7 is a diagram of abstraction model layers of a cloud computing environment in which embodiments of the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and audio quality feedback processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for audio quality feedback during live transmission from a source device that is received at multiple audience devices, the method carried out at a server and comprising:
    obtaining first audio information of an audio signal as received by at least some of the audience devices in a transmission session, obtaining audio information including obtaining an audio quality level of at least some of the audience devices by processing the received audio signal;
    classifying second one or more subsets of the audience devices by one or more common factors per subset;
    analyzing third the obtained audio information from the audience devices in conjunction with the classifications of the subsets of the audience devices to determine one or more common factors that affect received audio quality at an identified subset of the audience devices classified by the one or more common factors; and
    providing fourth feedback of the one or more common factors to at least one audience device in the identified subset or to the source device, the feedback including information on the determined common factors that are affecting the audio quality at the identified subset of the audience devices.

2. The method as claimed in claim 1, wherein processing the received audio signal converts the audio signal using a voice-to-text conversion process and analyzes the resultant text to evaluate the audio quality level.

3. The method as claimed in claim 2, wherein analyzing the resultant text to evaluate the audio quality level determines a ratio of converted words to gaps in a sample period of the audio signal.

4. The method as claimed in claim 1, wherein obtaining audio information of the audio signal as received by at least some of the audience devices in a transmission session includes:
    obtaining audio signal parameter data from the audience devices and comparing the audio signal parameters of the audience devices to determine a subset of audience devices having a similar received audio signal.

5. The method as claimed in claim 1, wherein classifying one or more subsets of the audience devices by one or more common factors per subset includes:
    obtaining details of factors of each audience device and grouping a subset of audience devices with the same one or more factors.

6. The method as claimed in claim 1, including analyzing the obtained audio information from the audience devices to determine if the audio information is below a threshold quality for all audience devices; and
    providing feedback to the source device that the overall audio quality being received is below a required quality.

7. The method as claimed in claim 1, including detecting a source device of a transmitted audio signal in the transmission session and determining audience devices in the transmission session from which to obtain audio information.

8. The method as claimed in claim 1, wherein analyzing the obtained audio information from the audience devices in conjunction with the classifications of the subsets of the audience devices includes determining a correlation between one or more common factors and an audio quality level of the identified subset.

9. The method as claimed in claim 8, wherein the audio quality level is one of a configured range of audio quality levels from poor quality to high quality levels.

10. The method as claimed in claim 1, wherein classifying the multiple audience devices by common factors includes classifying by one or more of the group of: a location, a communication channel, a transmission media, and a configuration or type of an audience device.

11. A computer-implemented method for audio quality feedback during live transmission from a source that is received at multiple audience devices, the method carried out at a server and comprising:
    obtaining first audio information of an audio signal as received by at least some of the audience devices in a transmission session, obtaining audio information including obtaining an audio quality level of at least some of the audience devices by processing the received audio signal;
    obtaining second factors relating to at least some of the audience devices in the transmission session;
    analyzing third the audio information and the factors to determine a correlation between a quality of the received audio signals and one or more common factors for a subset of the audience devices; and
    providing fourth feedback of the one or more common factors to at least one audience device in the subset or the source device, the feedback including information on the determined common factors that are affecting the audio quality at the identified subset of the audience devices.

12. The method as claimed in claim 11, wherein analyzing the audio information and the factors analyzes audio information in the form of a quality level and compares the quality levels within and between groups of audience devices having one or more common factors to determine a subset of audience devices having a shared quality level.

13. A system for audio quality feedback during live transmission from a source that is received at multiple audience devices, comprising a server having a processor and a memory configured to provide computer program instructions to the processor to execute the function of a feedback system including:
    an audio information obtaining component for obtaining audio information of an audio signal as received by at least some of the audience devices in a transmission session, the audio information obtaining component obtaining an audio quality of at least some of the audience devices by processing the received audio signal, processing the received audio signal including converting the audio signal using a voice-to-text conversion process and analyzing a resulting text to evaluate audio quality level by determining a ratio of converted words to gaps in a sample period of the audio signal;
    a classifying component for classifying one or more subsets of the audience devices by one or more common factors per subset;
    an analyzing component for analyzing the obtained audio information from the audience devices in conjunction with the classifications of the subsets of the audience devices to determine one or more common factors that affect received audio quality at an identified subset of the audience devices classified by the one or more common factors; and a feedback component for providing feedback of the one or more common factors to at least one of the audience devices in the identified subset or to the source device, the feedback component including information on the determined common factors that are affecting the audio quality.

14. The system as claimed in claim 13, wherein the audio information obtaining component obtains audio signal parameter data from the audience devices and the system include an audio comparing component for comparing the audio signal parameters of the audience devices to determine a subset of audience devices having a similar received audio signal.

15. The system as claimed in claim 13, wherein the classifying component obtains details of factors of each audience device and groups a subset of audience devices with the same one or more factors.

16. The system as claimed in claim 13, including an overall quality component for analyzing the obtained audio information from the audience devices to determine if the audio information is below a threshold quality for all audience devices and wherein the feedback component provides feedback to the source device that the overall audio quality being received is below a required quality.

17. The system as claimed in claim 13, wherein the feedback component provides feedback of the one or more common factors dynamically during the live transmission.

18. The system as claimed in claim 13, including a device detecting component for detecting a source device of a transmitted audio signal in the transmission session and determining audience devices in the transmission session from which to obtain audio information.

19. The system as claimed in claim 13, wherein the analyzing component for analyzing the obtained audio information from the audience devices in conjunction with the classifications of the subsets of the audience devices includes a correlation component for determining a correlation between one or more common factors and an audio quality level of the identified subset.

20. The system as claimed in claim 19, including a configuration component for receiving a configuration of the audio quality level.

21. A system for audio quality feedback during live transmission from a source that is received at multiple audience devices, the system comprising a server having a processor and a memory configured to provide computer program instructions to the processor to execute the function of a feedback system including:

an audio information for first obtaining component for obtaining audio information of an audio signal as received by at least some of the audience devices in a transmission session, the audio information obtaining component obtaining an audio quality level of at least some of the audience devices by processing the received audio signal;

a factor obtaining component for second obtaining factors relating to at least some of the audience devices in the transmission session;

an analyzing component for third analyzing the audio information and the factors to determine a correlation between a quality of the received audio signals and one or more common factors for a subset of the audience devices; and a feedback component for fourth providing feedback of the one or more common factors to at least one of the audience devices in the subset or the source device, the feedback component including information on the determined common factors that are affecting the audio quality at the identified subset of the audience devices.

22. A computer program product for audio quality feedback during live transmission from a source that is received at multiple audience devices, the computer program product comprising a non-transitory computer readable storage medium having program instructions embodied therewith, the program instructions executable by a processor to cause the processor to:

obtain audio information of an audio signal as received by at least some of the audience devices in a transmission session, the audio information obtained including an audio quality level of at least some of the audience devices by processing the received audio signal, processing the received audio signal including converting the audio signal using a voice-to-text conversion process and analyzing a resulting text to evaluate audio quality level by determining a ratio of converted words to gaps in a sample period of the audio signal;

classify one or more subsets of the audience devices by one or more common factors per subset;

analyze the obtained audio information from the audience devices in conjunction with the classifications of the subsets of the audience devices to determine one or more common factors that affect received audio quality at an identified subset of the audience devices classified by the one or more common factors; and provide feedback of the one or more common factors to at least one of the audience devices in the identified subset or to the source device, the feedback including information on the determined common factors that are affecting the audio quality at the identified subset of the audience devices.

* * * * *